United States Patent [19]
Waldspurger et al.
[11] 3,814,844
[45] June 4, 1974

[54] PRECISION DRIVE FOR VIDEO DISC RECORDER USING A FREE RUNNING OR CRYSTAL CONTROLLED OSCILLATOR

[75] Inventors: Edward C. Waldspurger; William E. Nichols, both of Dayton, Ohio

[73] Assignee: Arvin Industries, Inc., Columbus, Ohio

[22] Filed: Feb. 5, 1973

[21] Appl. No.: 329,571

[52] U.S. Cl...... 178/6.6 P, 178/6.6 DD, 178/69.5 F
[51] Int. Cl. .......... H04n 5/78
[58] Field of Search ........ 178/6.6 A, 6.6 DD, 6.6 P, 178/69.5 F, 69.5 TV, DIG. 1

[56] References Cited
UNITED STATES PATENTS

| | | | |
|---|---|---|---|
| 3,517,127 | 6/1970 | Grace | 178/69.5 F |
| 3,564,141 | 2/1971 | Hurst | 178/6.6 A |
| 3,636,253 | 1/1972 | Notani et al. | 178/6.6 DD |
| 3,718,754 | 2/1973 | Goshima et al. | 178/6.6 P |
| 3,729,583 | 4/1973 | Yano | 178/6.6 P |

*Primary Examiner*—Raymond F. Cardillo, Jr.
*Attorney, Agent, or Firm*—Biebel, French & Bugg

[57] ABSTRACT

A magnetic disc video recorder has a phase locked servo loop control for the disc drive. If an incoming signal is present, the horizontal sync information is separated from it and used to key a free running oscillator which in turn provides a reference signal to the servo loop. When no equalizing pulses are present in the incoming signal, the oscillator rings through the vertical interval. If there is no incoming signal, the oscillator is automatically converted to a crystal controlled oscillator.

4 Claims, 2 Drawing Figures

PRECISION DRIVE FOR VIDEO DISC RECORDER USING A FREE RUNNING OR CRYSTAL CONTROLLED OSCILLATOR

BACKGROUND OF THE INVENTION

This invention relates to video recording equipment, and particularly to video recorders which record single frame, or in some instances single field, video scenes, primarily as individual scenes as opposed to a succession of time related fields which reproduce motion. The most widely used equipment for this purpose comprises some form of magnetic recording disc rotated at a predetermined speed which is related to the frame rate of the video input signal. The video signal is gated to the recording transducer with respect to its synchronizing information such that a single frame, consisting of two interlaced fields and related synchronizing information, is recorded on the magnetic disc within a single circular track during one revolution of the recording disc.

A DC motor is connected to rotate the recording disc and also drives an electronic tachometer which is incorporated in a phase locked servo loop control to control the recording disc speed precisely with respect to the syncronizing information of the video signal. During recording the incoming video signal is applied to the recording transducer and also to a conventional sync separator circuit which separates both the vertical synchronizing information, for frame gating purposes, and the horizontal synchronizing information, for use in the phase comparator circuit of the servo loop control. The vertical sync signal is used to gate ON the video signal to the transducer at the beginning of a field, and to gate OFF this information at the end of the next field, thus recording only the video information for two successive interlaced fields making up one frame. This arrangement is commonly used both in recording broadcast television signals and closed circuit video signals, as from closed circuit cameras focused upon a scene. Such arrangements are used for surveillance, reconnaissance, training or educational programs and a number of other well known purposes.

The standards used for closed circuit television cameras, such as those published by the Electronic Industries Association, are different for different types of closed circuit television and for broadcast television signals. For example, the EIA Standard RS–170 for monochrome television studio facilities (broadcasting) requires a 60Hz field frequency, 525 lines/frame, and that within the vertical blanking interval of the signal the usual equalizing pulses and vertical sync pulses all be included. As is well known this information is used to synchronize the horizontal and vertical oscillator circuits of a television receiver operating from the broadcast signal.

There are other standards for closed circuit monochrome television. For example, EIA Standards RS–330 for closed circuit television provides the performance standards for a camera operating at the same field frequency as broadcast, 525 lines per frame, interlaced 2:1, giving resolution the same as the standard broadcast television signal. Equalizing pulses are optional, and often omitted for cost savings. A separate EIA Standard RS–343–A applies to high resolution monochrome closed circuit television cameras which operate in the range of 675 to 1,023 scanning lines with a 60Hz field rate, interlaced 2:1. Recommended line rates are 675, 729, 875, 945, or 1,023 lines/frame. Again equalizing pulses in the vertical blanking interval are optional, and often omitted.

A crystal controlled oscillator may be provided in typical video recording equipment as an alternate source of sync pulses. A typical system, such as disclosed hereafter, employs a DC servo motor driving the recording disc, and also driving a tachometer with a pulse rate of 175 pulses per revolution, which in a single frame recorder requiring 1,800 rpm to record one frame per revolution, translates to a tachometer output of 5,250Hz. The separated horizontal sync information from an incoming signal is divided down to 5,250Hz, and compared with the tachometer signal in a conventional phase detector circuit to provide a speed control for the motor. When a broadcast standard television signal is being recorded, the divider will divide by three, reducing the 15.75KHz horizontal sync information appropriately. Other horizontal sync rates may be received, for example when using a high resolution closed circuit camera, and for that purpose a special type of divider may be required, or different dividers may be required, since the line rates in the high resolution signal will be at a higher frequency.

When there is no incoming signal to the recorder, for example when it is desired to playback without the equipment being connected to a signal source, a crystal controlled oscillator having an appropriate frequency which is an integral multiple of 5,250Hz is connected as an alternative input to the divider circuit. This provides the source for a comparison signal used in the motor servo control. However, if the equipment is connected to an incoming signal, the sync information from that source takes precedence. As a result, when closed circuit cameras are used as the source of incoming video information, and these cameras do not produce a signal including equalizing pulses as is often the case, during each vertical interval there is in effect no incoming signal, and the servo then looks to the crystal controlled oscillator for its reference. If the sync signal from the camera is out of phase with, or slightly off, the desired frequency, this can result in a shift in the sync information to the servo during every vertical interval, causing the servo to hunt and introducing unacceptable speed changes due to the hystersis of the servo control and the disc it is driving.

SUMMARY OF THE INVENTION

In accordance with the present invention, a reference sync system is provided in which, so long as there is any information coming through the video signal input, this information is used to key a free running oscillator circuit, which in turn provides control pulses to the phase detector. If there is no incoming signal, a crystal controlled oscillator is substituted for the free running oscillator. In a simple embodiment of the invention, this is accomplished merely by substituting an appropriate capacitor for a crystal in the same basic oscillator circuit and providing a keying input to the oscillator for the sync separator circuit whenever the crystal is disconnected from the oscillator circuit. As a result, the free running oscillator circuit will ring through the vertical interval, and maintain a pulse rate corresponding to the separated sync with which it is being keyed during most of the duration of the input signal.

The time constants of the circuits are such that if the recording equipment is receiving a video signal lacking the equalizing pulses during the vertical blanking interval, the control will not react immediately to connect the crystal back into the oscillator circuit (thus create a crystal controlled oscillator) for a short period of time, and during this time the free running oscillator continues to ring at the frequency at which it is being keyed by the incoming horizontal sync information. Hence when the vertical blanking interval is passed the separated horizontal sync pulses will resume and continue to key the free running oscillator circuit, and its output will remain the controlling phase comparison signal to the motor servo system.

Therefore, the primary object of this invention is to provide a control for a video recorder which is capable of providing synchronizing information from an incoming video signal, and for continuing the control input during moments when separated horizontal sync information may not be available, and also for providing a separate precisely controlled reference signal input to the motor servo for those times when no incoming video signal is available; to provide such an arrangement wherein a crystal controlled oscillator circuit is used to provide the reference when no incoming video signal is available, and wherein this circuit is changed to a free running oscillator circuit whenever input video information is available to the recorder; and to provide such an arrangement wherein a free running oscillator circuit is employed during the time that an input video signal is available, with the free running oscillator keyed from sync information separated from the video signal, and the oscillator being capable of continuing its output for short periods of time such as through a vertical blanking interval in which equalizing pulses are omitted.

Other objects and advantages of the invention will be apparent from the following description, the accompanying drawing and the appended claims.

DESCRIPTION OF THE PREFERRED EMBODIMENT

Figure 1:
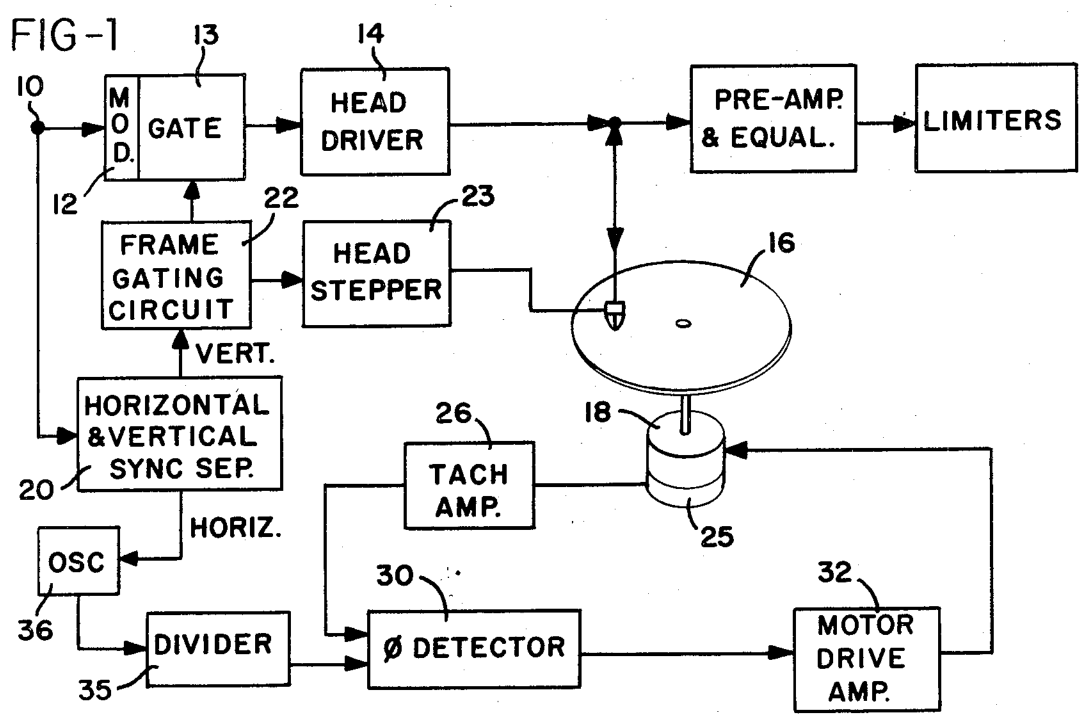
FIG. 1 is a block diagram of a servo control such as provided by the invention, illustrated in conjunction with a single frame disc type magnetic video recorder.

Referring to FIG. 1, the input terminal 10 is adapted to receive the video signal to be recorded. This signal may be from one of several types of video cameras, as previously described, or from a receiver operating from a broadcast signal. This signal is connected to two circuits, namely a modulator circuit 12 and gate circuit 13 which controls the application of the video signal to the head driver circuit or amplifier 14. The head driver in turn applies the circuit to the magnetic transducer 15 which cooperates with the recording media, in this case a disc 16 of magnetic recording tape which is rotated by a suitable DC servo motor 18, usually at a rate of 1,800 revolutions per minute for single frame recording.

The other path for the incoming video signal is to a conventional sync separator circuit 20 which separates the horizontal and vertical synchronizing information from the video signal. The vertical sync information is applied to a frame gating control circuit 22 which in turn controls the gate circuit 13 for the video signal to be recorded, and which may also be used to control a head stepper circuit 23 which is connected as shown schematically to reposition the transducer 15 to follow a different circular path for each frame of video signal to be recorded.

Since the vertical blanking interval appears at the end of each field, or twice each frame, the conventional arrangement in a single frame recording unit is to actuate the frame gating circuit 22 when recording is desired, then it will enable gate circuit 13 upon occurrence of the next separated vertical sync pulse, and continue to enable the gate circuit 13 until the frame gating circuit receives two more vertical sync signals, at which time the gate circuit 13 will be disabled. During the interval that the gate circuit 13 is enabled the incoming video signal for one complete frame will be applied to the recording transducer through the head driver circuit 14. Since the disc makes 30 revolutions per second, and the frame rate is the same, a single frame will be recorded within one revolution of the recording disc 16, and then the transducer may be moved to a different circular track.

The speed of the motor 18 is closely controlled by a closed servo loop which locks the motor speed to the scanning frequency of the incoming video signal. A tachometer 25 is driven from motor 18, and its output is connected through the tachometer amplifier 26 to a phase detector circuit 30. The output of the phase detector circuit is in turn connected to the motor drive amplifier 32 which controls the power supply to the DC motor 18, regulating its rotational speed. The comparison input to the phase detector 30 is provided from a divider circuit 35 which in turn receives inputs from oscillator and control circuits 36 during both recording and playback. The sync separator circuit supplies the separated horizontal sync signals to the oscillator and control circuits whenever a video signal is available at terminal 10 regardless or whether the equipment is in the recording or the playback mode. The oscillator circuit outputs are in turn divided to a frequency comparable to the output of the tachometer 25.

Since the video recording equipment should be compatible with broadcast video signals, the criteria for handling such signals establish certain parameters for the equipment. Broadcast video signals are, by standard, at 525 lines per frame, using interlaced fields at a field rate of 60Hz. This means that the time required to record a single frame of broadcast video information is one-thirtieth of a second. The movement of the recording media can therefore conveniently be driven directly by a motor operating at thirty revolutions per second. Particularly in disc type recorders, this means that a single frame can be recorded in a circular track during one revolution of the disc.

In the standard broadcast video signal format, the horizontal sync frequency for a 525 line frame is 15,250Hz. The smallest integer divisor of that frequency is 175. Hence, a tachometer is chosen having a rate of 175 pulses per revolution, which at the desired thirty revolution per second speed provides an output from the tachometer amplifier 26 of 5,250Hz. The stripped horizontal sync frequency from the sync separator circuit 20 may then be divided in the divider circuit 35 to provide a corresponding output at 5,250Hz to the phase comparator circuit 30 (typical type MC4044). That circuit, according to known principles, provides a difference output until the two inputs to it correspond, thereby adjusting the motor speed precisely into synchronism with the incoming video signal.

Figure 2:
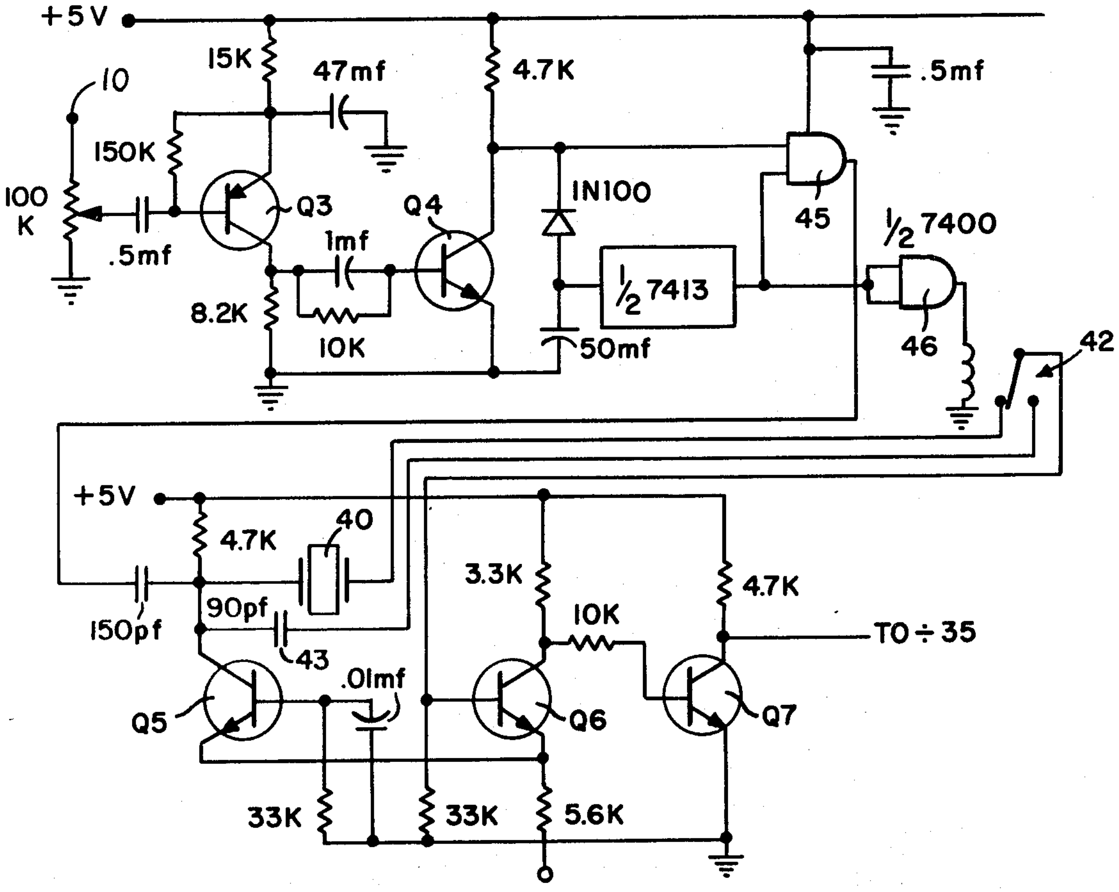
FIG. 2 is a circuit diagram illustrating the features of the invention.

FIG. 2 is a circuit diagram showing portions of the system as illustrated in the block diagram of FIG. 1, in particular the sync separator circuit and the oscillator and control circuits 36. The input video signal at the terminal 10 is fed through the sync separator circuit, which includes transistors Q3 and Q4 and the integrated circuit 7413 (1/2) which is a dual NAND Schmitt trigger circuit receiving its input through the 50mf capacitor as shown. The time constant of this portion of the circuit is sufficiently large that the Schmitt trigger output to the AND gates (two of the four gates in an integrated circuit type 7400) will continue through the length of a vertical blanking interval, should the video input signal be from a closed circuit camera which does not have the equalizing pulses included. The oscillator circuit is shown at the bottom of FIG. 2 and includes the transistors Q5, Q6 and Q7, together with the components connected thereto as indicated.

In fact, this circuit comprises two different oscillator circuits, the change depending upon the presence or absence of a video input signal at terminal 10. The 31.5KHz crystal 40 is normally connected into the circuit through the normally closed contact of a relay 42, whereas the capacitor 43 may be connected into the oscillator circuit in place of the crystal, through the normally open contact of relay 42. The common contact 42 is connected to the base of transistor Q6.

The separated horizontal sync signal is supplied through one of the AND gates 45 and the 150 pf capacitor to the input of the oscillator circuit. The other AND gate 46, controlled by the Schmitt trigger circuit, in turn controls the coil of relay 42.

When no video signal input is present at terminal 10 for a period greater than the time constant of the input circuit to the Schmitt trigger, relay 42 will be deenergized and the crystal 40 will be connected into the oscillator through the normally closed contact of the relay, thus forming a crystal controlled oscillator circuit having an output, in this particular case, of 31.5KHz. The output of the oscillator circuit is fed to the divider 35 which in turn divides down this reference frequency to 5,250Hz, for comparison with the tachometer output fed to the phase detector 30.

If a video signal is present, relay 42 is energized, and the capacitor 43 is substituted for crystal 40 in the oscillator circuit, thus forming a free running oscillator circuit which is keyed through the 150pf capacitor from the separated horizontal sync signal present at the output of AND gate 45. Therefore, whenever a video input signal of any type is present at the input terminal, the motor servo control receives its reference from that signal. Only when there is no video input signal to the recorder is the crystal controlled oscillator circuit used as a reference.

If the input video signal is of the type having no equalizing pulses during the vertical blanking interval, the free running oscillator circuit will ring, or continue to oscillate, at the frequency of the signal with which it had been keyed through AND gate 45, for a period sufficient to carry through the vertical blanking interval. Therefore, if the separated horizontal sync signal at the input should be somewhat off the optimum frequency standard, the unit will continue to use whatever the incoming sync signal is as a reference, and it will not try to revert to the precise frequency of the crystal controlled oscillator during vertical blanking intervals where no equalizing pulses are present.

While the form of apparatus herein described constitutes a preferred embodiment of the invention, it is to be understood that the inveniton is not limited to this precise form of apparatus, and that changes may be made therein without departing from the scope of the invention which is defined in the appended claims.

What is claimed is:

1. In a video recorder having transducer means for recording and playback of a video signal, a magnetic recording media, means including a drive motor for moving said media past said transducer means and a controller for said motor, an input terminal for video signals to be recorded, circuit means connecting signals from said input terminal to said transducer means, a tachometer driven by said motor, a sync separator circuit connected to said input terminal and operative to separate synchronizing information from the input signal, a phase detector receiving signals from said tachometer and providing corrective drive signals to said motor controller;

the improvement comprising a crystal controlled oscillator circuit, a free running oscillator circuit, control circuit means responsive to presence of an input signal at said terminal and controlling said oscillator circuits to provide a first comparison input from said crystal controlled oscillator to said phase detector when no input signal is present at said terminal and to provide a second comparison input to said phase detector from said free running oscillator when an input signal is present at said terminal, and a control connection from said sync separator circuit to said free running oscillator to key it from sync information in the input video signal.

2. A video recorder as defined in claim 1, said media being a disc having a magnetizable surface, said transducer being mounted to follow at least one circuit path on said disc surface, and said controller operating said motor at a speed related to the video signal frequency to allow recording of a single frame in one circular path.

3. In a magnetic disc video recorder having a transducer for recording and playback of a video signal, a magnetic recording disc, a drive motor connected to rotate said disc past said transducer, a controller for said motor, an input terminal for video signals to be recorded, a gating circuit connected to control the application of signals from said input terminal to said transducer, a tachometer driven by said motor, a sync separator circuit connected to said input terminal and operative to separate synchronizing information from the input signal, a phase detector receiving feedback signals from said tachometer and providing corrective drive signals to said controller;

the improvement comprising an oscillator circuit, a crystal adapted for connection to said oscillator circuit to establish its frequency, a circuit component substitutable for said crystal to make said oscillator circuit free running, control circuit means responsive to presence of an input signal at said terminal and controlling the correction of said crystal or said circuit component into said oscillator circuit to provide a first comparison input from a crystal controlled oscillator to said phase detector when no input signal is present at said terminal and to provide a second comparison input to said phase detector from a free running oscillator when an input signal is present at said terminal, and a control connection from said sync separator circuit to said oscillator circuit to key it from sync information in the input video signal when it is functioning as a free running oscillator.

4. In a video recorder having transducer means for recording and playback of a video signal, a magnetic recording media, means including a drive motor and a motor controller for moving said media past said transducer means at a predetermined speed, an input terminal for video signals to be recorded, a gating circuit connected to control the application of signals from said input terminal to said transducer means, a tachometer driven by said motor, a sync separator circuit connected to said input terminal and operative to separate synchronizing information from the input signal, and a phase detector receiving signals from said tachometer and providing corrective drive signals to said motor controller;

the improvement comprising an oscillator circuit switchable between free running and fixed frequency modes, a control connection from said sync separator circuit to said oscillator circuit to key it from sync information in the input video signal, and control circuit means responsive to presence of an input signal at said terminal and controlling the operating mode of said oscillator circuit to provide a fixed frequency input from said oscillator circuit to said phase detector when no input signal is present at said terminal or to provide a comparison input to said phase detector from said oscillator circuit as keyed from the sync information in any input signal present at said terminal.

* * * * *

PO-1050
(5/69)

UNITED STATES PATENT OFFICE
CERTIFICATE OF CORRECTION

Patent No. 3,814,844 Dated June 4, 1974

Inventor(s) Edward C. Waldspurger & William E. Nichols

It is certified that error appears in the above-identified patent and that said Letters Patent are hereby corrected as shown below:

Column 2, line 60, "for" should be --from--. Column 4, line 39, "or" should be --of--; same column, line 58, "15,250 Hz" should be --15,750Hz--.

Signed and sealed this 5th day of November 1974.

(SEAL)
Attest:

McCOY M. GIBSON JR.
Attesting Officer

C. MARSHALL DANN
Commissioner of Patents